United States Patent
Ashizawa et al.

[11] Patent Number: 5,936,158
[45] Date of Patent: Aug. 10, 1999

[54] ACCELERATION ESTIMATION DEVICE

[75] Inventors: Hiroyuki Ashizawa, Fujisawa; Kazutaka Adachi, Yokohama; Ken Ito, Tokyo, all of Japan

[73] Assignee: Nissan Motor Co., Ltd., Yokohama, Japan

[21] Appl. No.: 08/977,632

[22] Filed: Nov. 25, 1997

[30] Foreign Application Priority Data

Nov. 25, 1996 [JP] Japan ................................. 8-313617

[51] Int. Cl.⁶ .............................................. G01P 15/00
[52] U.S. Cl. .............................................. 73/488
[58] Field of Search ........................... 73/488, 116, 117.2; 477/110, 120, 183, 184, 185, 186, 187; 123/350, 352; 180/178, 179, 197

[56] References Cited

U.S. PATENT DOCUMENTS

| | | | |
|---|---|---|---|
| 4,350,057 | 9/1982 | Kishi et al. | 477/121 |
| 4,656,587 | 4/1987 | Osanai et al. | 474/12 |
| 4,938,604 | 7/1990 | Naito et al. | 180/179 |
| 5,010,490 | 4/1991 | Naito et al. | 701/35 |
| 5,329,454 | 7/1994 | Takada et al. | 180/178 |
| 5,382,206 | 1/1995 | Oda et al. | 180/197 |
| 5,434,786 | 7/1995 | Sakonjyu et al. | 123/352 |
| 5,608,631 | 3/1997 | Tsutsumi et al. | 73/1.38 |
| 5,749,063 | 5/1998 | Sakonjyu et al. | 123/350 |
| 5,765,117 | 6/1998 | Horiguchi | 477/120 |

*Primary Examiner*—Hezron Williams
*Assistant Examiner*—Richard A. Moller
*Attorney, Agent, or Firm*—Foley & Lardner

[57] ABSTRACT

A sensor is provided for detecting traveling speed of a vehicle, and a first deviation between the traveling speed and an estimated vehicle speed calculated beforehand is calculated. Based on the first deviation and a predetermined function, a feedback compensation output is calculated, and a second deviation between a value obtained by performing on the feedback compensation output and the aforesaid estimate vehicle speed is output as an estimated acceleration. Delay processing is performed on the estimated acceleration, and an estimated vehicle speed is updated. Noise mixed with the acceleration estimation process is eliminated, and the acceleration is thereby estimated with high precision.

9 Claims, 10 Drawing Sheets

ACCELERATION ESTIMATION DEVICE

FIELD OF THE INVENTION

This invention relates to an improvement of an acceleration estimation device used on vehicles.

BACKGROUND OF THE INVENTION

An acceleration estimation device for a vehicle is known in the art which estimates an acceleration produced on a vehicle using, for example, a digital differentiation method wherein a variation of vehicle speed is found from a past vehicle speed signal and a current vehicle speed signal.

This acceleration estimation device is used for example in a transmission controller of a continuously variable transmission. The transmission control determines the gradient of a road, such as a flat path or a downhill slope, from the estimated acceleration and a throttle opening, and a speed change ratio according to traveling conditions is applied.

However, in this acceleration estimation device, there is some noise in the vehicle speed signal due to the effect of computational error or the road surface even when the vehicle is traveling at constant speed. When, for example, the period of estimating the acceleration is 10 milliseconds and the vehicle speed signal fluctuates by ±0.1 Km/hr, a maximum error of 0.566 G occurs in the estimated acceleration. This error considerably affects the control precision of the speed change controller.

SUMMARY OF THE INVENTION

It is therefore an object of this invention to reduce the effect of noise and road surfaces on an acceleration estimation device.

In order to achieve the above object, this invention provides a device for estimating an acceleration of a vehicle. The device comprises a sensor for detecting a traveling speed of the vehicle, and a microprocessor. The microprocessor is programmed to calculate a first deviation between the traveling speed and an estimated vehicle speed calculated beforehand, calculate a feedback compensation output based on the first deviation and a predetermined function, output a second deviation between a value obtained by performing a delay processing on the feedback compensation output and the estimated vehicle speed as an estimated acceleration, and calculate the estimated vehicle speed by performing a delay processing on the estimated acceleration.

It is preferable that the predetermined function comprises an integrator and a constant gain.

It is also preferable that the predetermined function comprises an integrator, a constant gain and a phase compensator.

This invention also provides a device comprising a microprocessor programmed to calculate a first deviation between the traveling speed and an estimated vehicle speed calculated beforehand, calculate a feedback compensation output based on the first deviation and a predetermined function, calculate the estimated vehicle speed by multiplying the feedback compensation output by a delay component based on a delay time $T_M$, and calculate an estimated vehicle acceleration by dividing a second deviation between the estimated vehicle speed and the feedback compensation output by the delay time $T_M$.

It is preferable that the delay component is given by the following expression.

$$G_M(s) = \frac{1}{T_M \cdot s + 1}$$

where, $G_M(s)$=Delay component,
$T_M$=Delay time,
s=Laplacian operator

It is also preferable that the predetermined function comprises an integrator and a constant gain.

It is also preferable that the predetermined function comprises an integrator, a constant gain and a phase compensator.

In this case, it is further preferable that the phase compensation function of the phase compensator is given by the following expression:

$$G_h(s) = \frac{T_1 \cdot s + 1}{T_2 \cdot s + 1}$$

where, $G_h(s)$=phase compensation function
$T_1$=phase compensation constant 1
$T_2$=phase compensation constant 2
s=Laplacian operator.

It is also preferable that the delay component comprises the following expressions:

$$G_M(s) = \exp(-T_M \cdot s)$$

where, $G_M(s)$=dead time
$T_M$=delay time
s=Laplacian operator

The details as well as other features and advantages of this invention are set forth in the remainder of the specification and are shown in the accompanying drawings.

DESCRIPTION OF THE PREFERRED EMBODIMENTS

Figure 1:
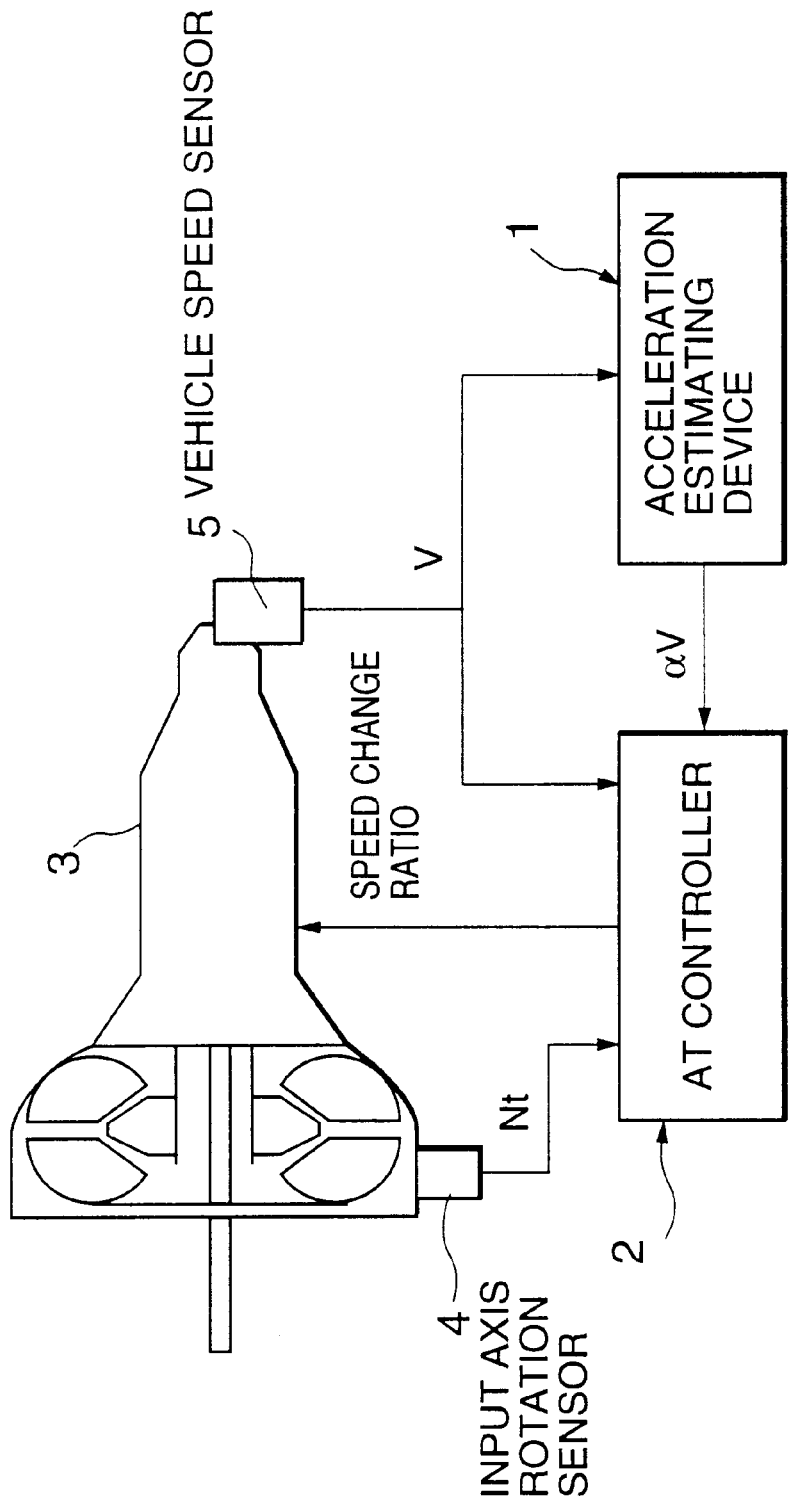
FIG. 1 is a schematic diagram of an automatic transmission to which this invention is applied.

Referring to FIG. 1 of the drawings, an automatic transmission 3 comprises an input shaft rotation sensor 4 on an input shaft, and a vehicle speed sensor 5 (output shaft rotation speed sensor) on an output shaft.

An input shaft rotation speed detected by the input shaft rotation speed sensor 4 and a vehicle speed V detected by the input shaft rotation sensor 5 are input to an automatic transmission (AT) controller 2. The vehicle speed V is also input to an acceleration estimating device 1.

The AT controller 2 comprises a microcomputer, computes a target speed change ratio of the transmission 3 according to an estimated acceleration estimated by the acceleration estimating device 1 and a throttle opening of an engine, not shown, and performs speed change control of the automatic transmission 3.

Figure 2:
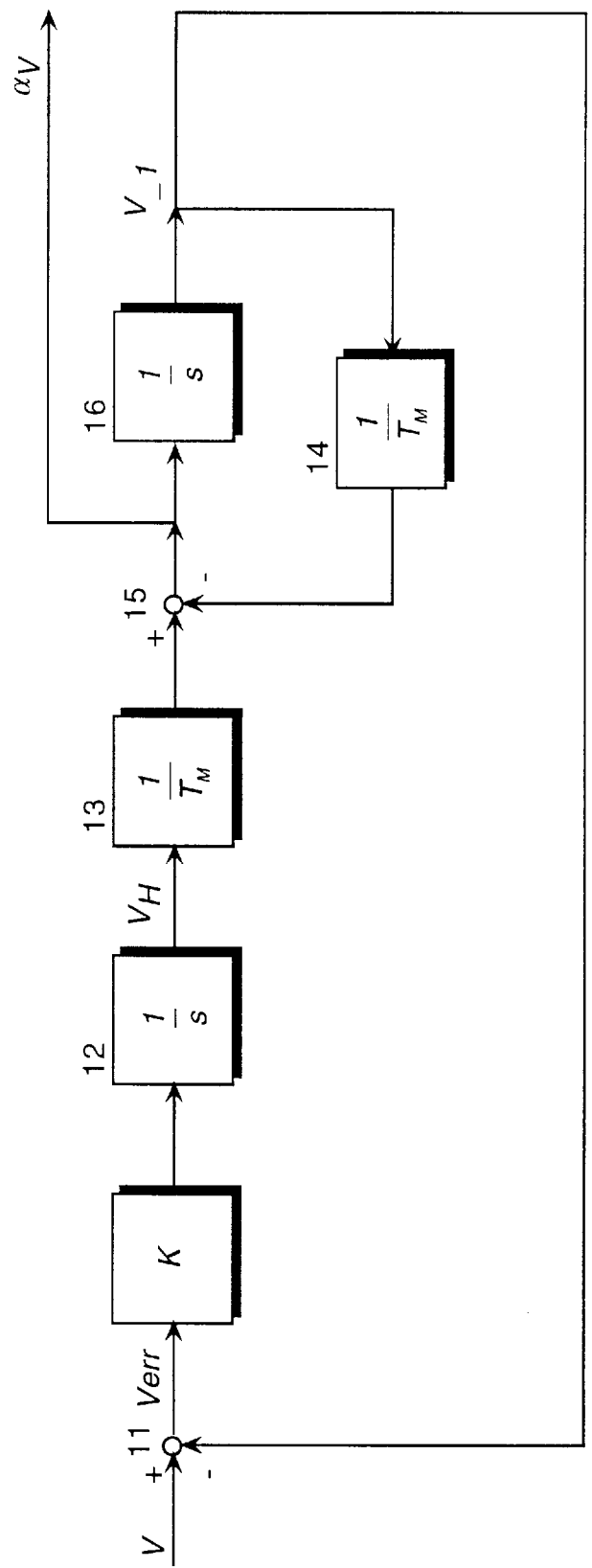
FIG. 2 is a block diagram of an acceleration estimation device according to this invention.

The construction of the acceleration estimate device 1 is shown by the block diagram of FIG. 2. First, a vehicle speed deviation Verr is computed in a subtractor 11 by the following equation from a current true vehicle speed V read by the vehicle speed sensor 5 and the estimated vehicle speed $V_{-1}$ on the immediately preceding occasion.

$$\text{Verr} = V - V_{-1} \qquad (1)$$

Next, a feedback compensation output $V_H$ is computed, from the vehicle speed deviation Verr as input, by the following integral operation in an integrator 12 using a preset feedback gain K.

$$V_H = \text{Verr} \cdot K \cdot 1/s \qquad (2)$$

where, s=Laplacian operator

A deviation between a value obtained by dividing the feedback compensation output $V_H$ by a first-order lag time-constant $T_M$ in a divider 13, and a value obtained by dividing the estimated vehicle speed $V_{-1}$ by the first-order lag time-constant $T_M$ in a divider 14, is found by the subtraction device 15. This is an estimated acceleration $\alpha_v$.

The integral value obtained in the integrator 16 using the estimated acceleration $\alpha_v$ as input is an estimated vehicle speed $V_{-1}$. Accordingly, the output of the subtractor 15 is output to the speed change control controller 2 as the estimated acceleration $\alpha_v$.

The processing performed by the dividers 13 and 14 mentioned above is represented by the next expression (3).

$$\alpha_V = V_H \cdot \frac{1}{T_M} - V_{-1} \cdot \frac{1}{T_M} \qquad (3)$$

The estimated acceleration $\alpha_v$ found in this way is input to the integrator 16. The integrator 16 integrates this estimated acceleration $\alpha_v$ so as to calculate an estimated vehicle speed $V_{-1}$. The calculated estimated vehicle speed $V_{-1}$ is used to calculate the vehicle speed deviation Verr mentioned above.

Figures 3A, 3B:
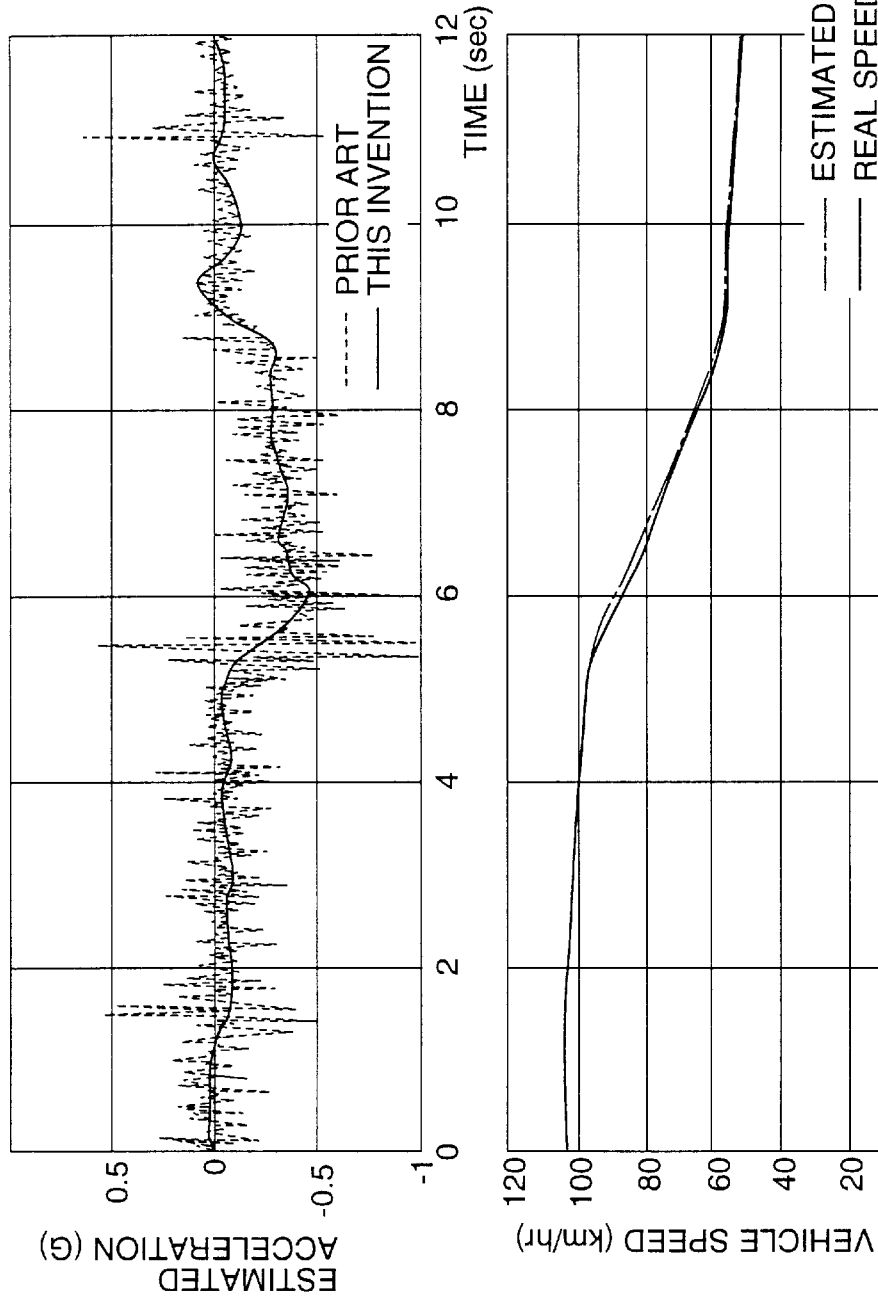
FIGS. 3A and 3B are graphs showing vehicle speed and estimated acceleration when vehicle speed is reduced by inertial deceleration from approximately 100 Km/hr, according to the acceleration estimation device.
Figures 4A, 4B:
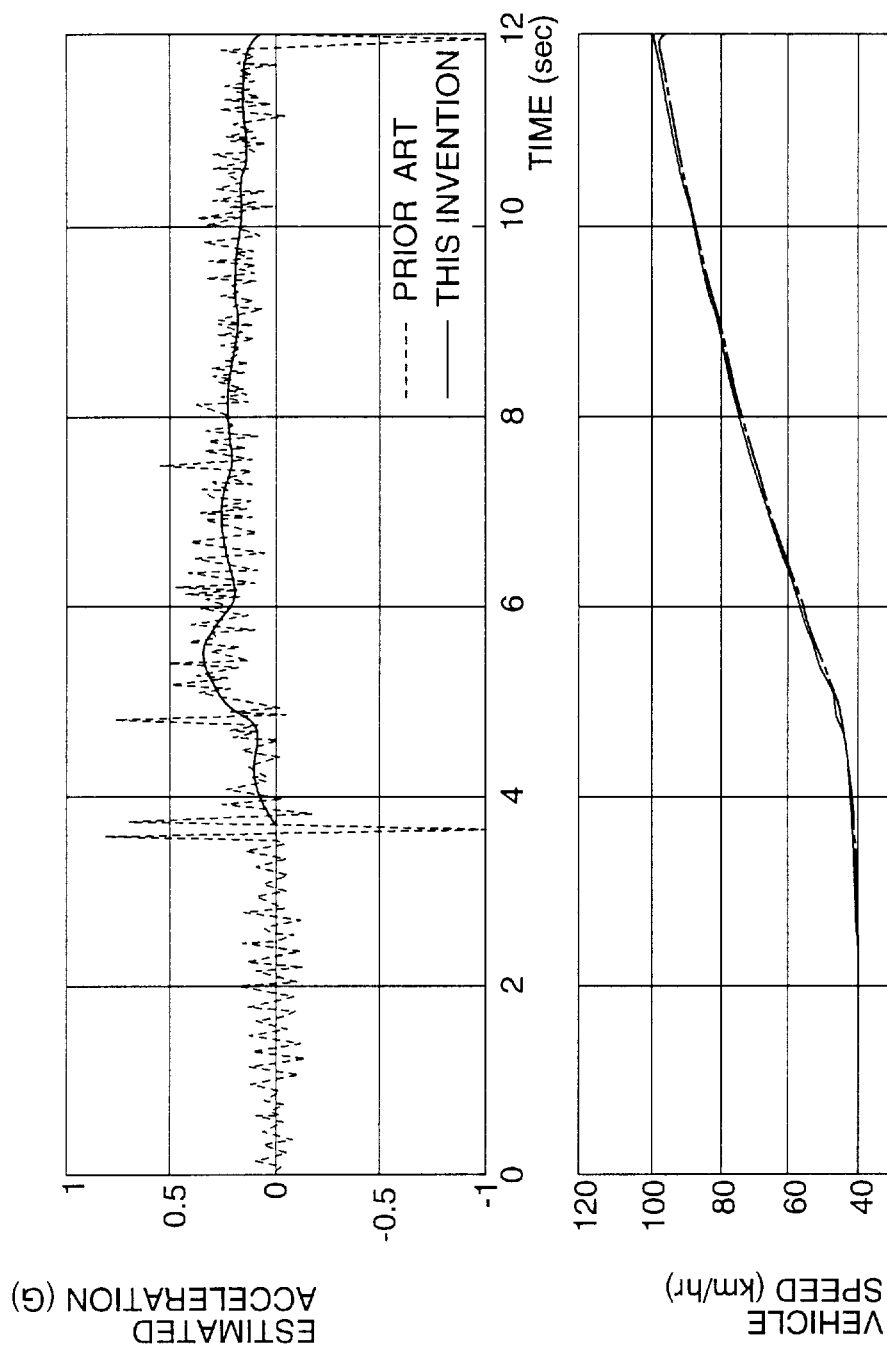
FIGS. 4A and 4B are graphs showing vehicle speed and estimated acceleration when vehicle speed is suddenly increased from approximately 40 Km/hr, according to the acceleration estimation device.

The estimated acceleration $\alpha_v$ and estimated vehicle speed $V_{-1}$ calculated in this way are shown in FIGS. 3A and 3B and FIGS. 4A and 4B. The broken lines of FIGS. 3A and 4A show the estimated acceleration obtained by conventional digital differentiation, and the solid lines show the estimated acceleration $\alpha_v$ obtained by the acceleration estimation device. The solid lines of FIGS. 3B and 4B show the true vehicle speed, and the dot-and-dash lines show the estimated vehicle speed $V_{-1}$ obtained by the acceleration estimation device 1.

FIGS. 3A and 3B show the estimated acceleration $\alpha_v$ and estimated vehicle speed $V_{-1}$ when inertial deceleration is performed by releasing the accelerator pedal from a vehicle speed V=100 km/hr. FIGS. 4A and 4B show the estimated acceleration $\alpha_v$ and estimated vehicle speed $V_{-1}$ during rapid acceleration from a vehicle speed V=4 km/hr.

In this way, by applying the first-order delay time-constant $T_M$ to the feedback compensation output $V_H$ in the calculation of the estimated acceleration $\alpha_v$, noise is largely reduced compared with the estimated acceleration obtained by conventional digital differentiation.

In FIG. 2, when true vehicle speed V and estimated vehicle speed $V_{-1}$ are equal, the input to the integrator 16 which outputs the estimated vehicle speed $V_{-1}$ is a differential value of vehicle speed, i.e. the acceleration of the vehicle.

In this embodiment, the acceleration estimate device 1 is applied to speed change control, but it may also be applied to the case where the acceleration produced in the vehicle is estimated from wheel speed, as in the case of a drive force controller such as an anti-skid brake or traction control device.

Figure 5:
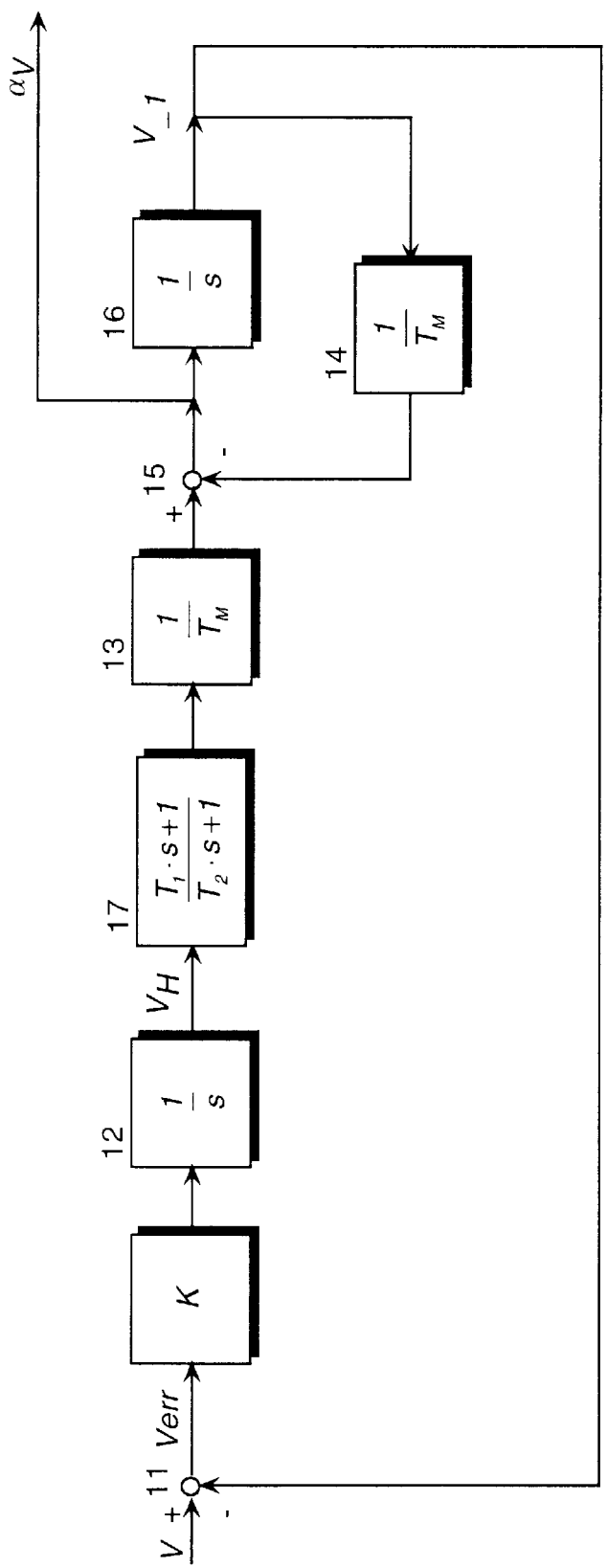
FIG. 5 is a block diagram of an acceleration estimation device according to a second embodiment of this invention.

FIG. 5 shows a second embodiment of this invention.

According to this embodiment, a first order/first order phase compensator 17 is added to the acceleration estimation device 1 of the aforesaid first embodiment. The remaining features of the construction are the same as those of the first embodiment. A phase compensation function $G_h(s)$ of the phase compensation device 17 is defined by the following expression (4).

$$G_h(s) = \frac{T_1 \cdot s + 1}{T_2 \cdot s + 1} \qquad (4)$$

where, $G_h(s)$=phase compensation function
$T_1$=phase compensation constant 1
$T_2$=phase compensation constant 2
s=Laplacian operator As in the case of the aforesaid first embodiment, when a feedback compensation computation is performed from a constant K and the integrator 12, a transfer function G(s) of the feedback system may be given by the following expressions (5)–(7).

$$G(s) = \frac{K \cdot T_M s + K}{s^2 + 2 \cdot \zeta \cdot \omega_n \cdot s + \omega_n^2} \qquad (5)$$

where, $\omega_n$=natural vibration frequency $$\omega_n = \text{natural vibration frequency} \qquad (6)$$
$$= \sqrt{\frac{K}{T_M}}$$

$$\zeta = \text{damping factor} \qquad (7)$$
$$= \frac{1}{2} \cdot \sqrt{\frac{1}{T_M \cdot K}}$$

From the above expressions (5)–(7), the following conclusions may be derived regarding a natural vibration frequency $\omega_n$ and a damping factor $\zeta$.

First, when the feedback gain K is increased in order to reduce the deviation between the true vehicle speed V and estimated vehicle speed $V_{-1}$ the system becomes a "high natural vibration frequency $\omega_n$, poor attenuation" system. Even if the first-order delay time-constant $T_M$ is large, the system is still a "poor attenuation" system.

The first order/first order phase compensation device 17 was therefore added to the feedback compensation computation part in the second embodiment so that the designer can freely set the response characteristics of the system. By adding the phase compensation device 17, a loop transfer function $G(s)$ is given by the following expression:

$$G(s) = \frac{K \cdot T_1 \cdot T_M \cdot s^2}{(s + Pm) \cdot (s^2 + 2 \cdot \zeta \cdot \omega_n \cdot s + \omega_n^2)} \quad (8)$$
$$= \frac{K \cdot T_1 \cdot T_M \cdot s^2 + K \cdot (T_1 + T_M) \cdot B_1 \cdot s + K \cdot B_0}{s^3 + A_2 \cdot s^2 + A_1 \cdot s + A_0}$$

where:

$$A_2 = Pm + 2 \cdot \zeta \cdot \omega_n = \frac{T_1 + T_M}{T_2 \cdot T_M} \quad (9)$$

$$A_2 = 2 \cdot \zeta \cdot \omega_n \cdot Pm + \omega_n^2 = \frac{1 + K \cdot T_1}{T_2 \cdot T_M} \quad (10)$$

$$A_0 = \omega_n^2 \cdot Pm = \frac{1}{T_2 \cdot T_M} \quad (11)$$

Pm=first-order delay pole

To three unknowns in the above expressions (9)–(11), i.e. first order delay pole Pm, natural vibration frequency $\omega_n$ and damping factor $\xi$, the designer can arbitrarily set three constants, i.e. phase compensation constants $T_1$, $T_2$ and the feedback gain K.

Accordingly, the phase compensation constants $T_1$, $T_2$ and feedback gain K can be determined based on the above expressions (8)–(10) so as to obtain the first delay pole Pm, natural vibration frequency $\omega_n$ and damping factor $\xi$ desired by the designer.

Figures 6A, 6B:
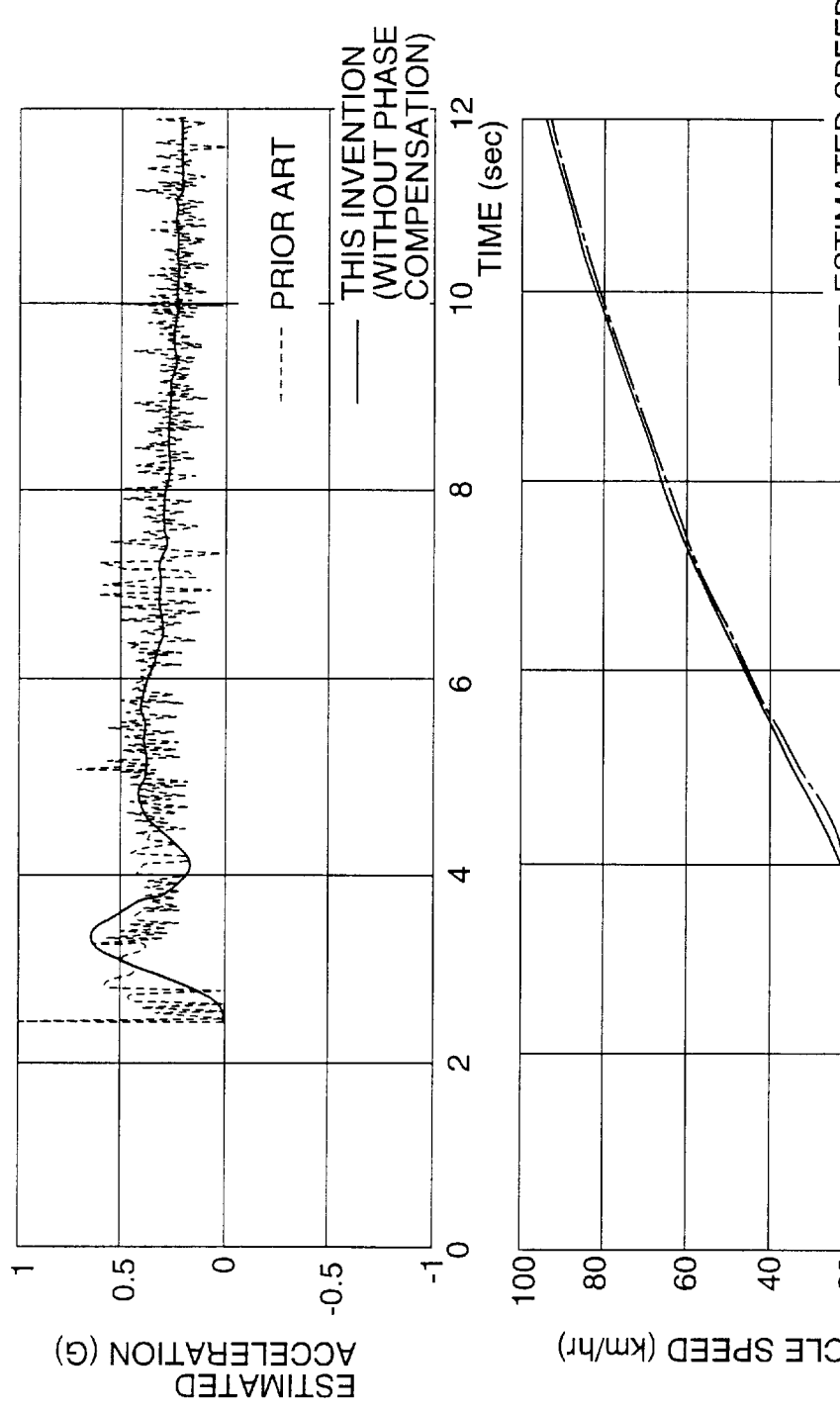
FIGS. 6A and 6B are graphs showing vehicle speed and estimated acceleration when the vehicle accelerates from rest according to an acceleration estimation device without phase compensator according to this invention.
Figures 7A, 7B:
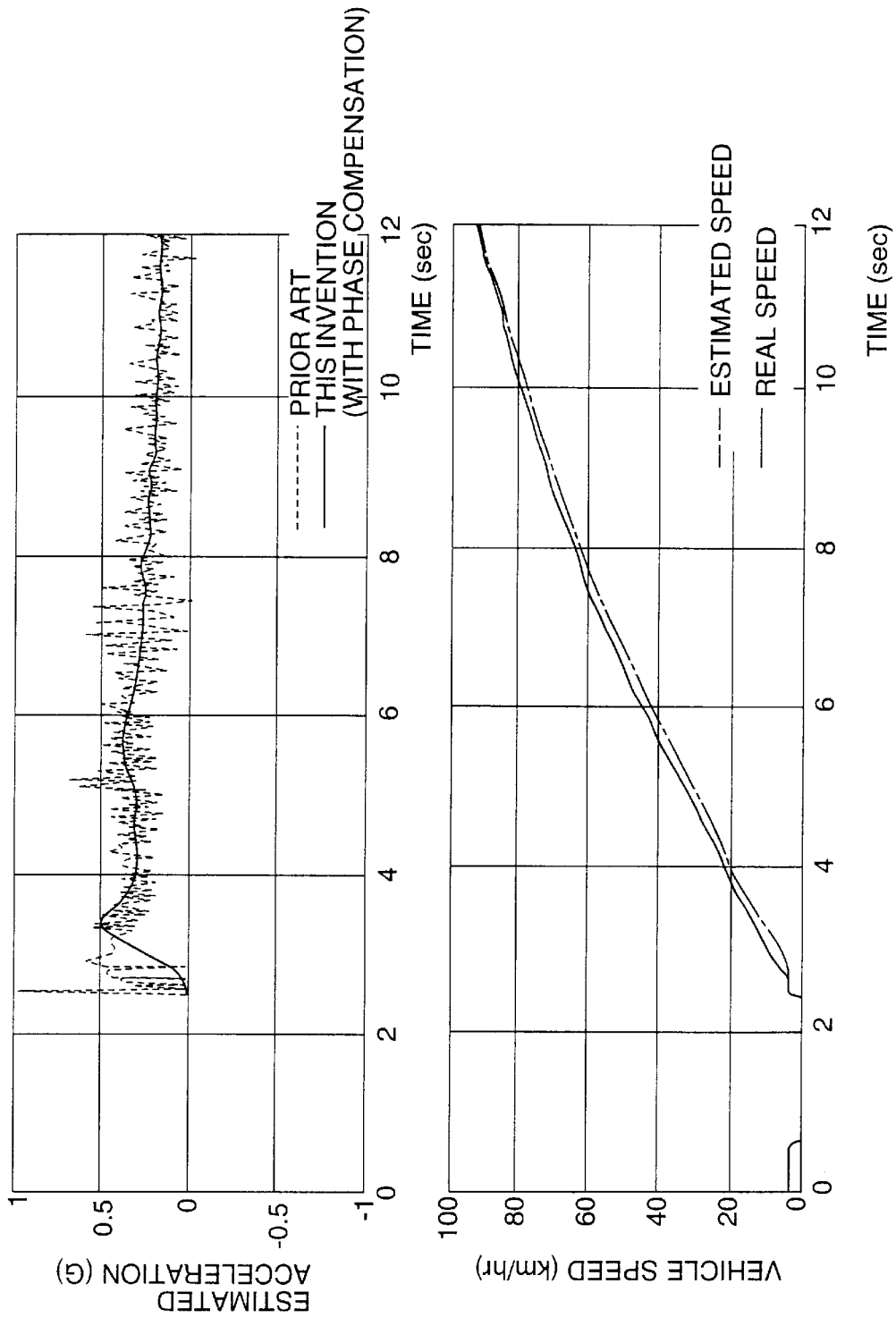
FIGS. 7A and 7B are graphs showing vehicle speed and estimated acceleration when the vehicle accelerates from rest a according to an acceleration estimation device with phase compensator according to this invention.

FIGS. 6A and 6B show a change of the estimated acceleration $\alpha_v$ and vehicle speed when the vehicle starts and accelerates if phase compensation is not performed as in the aforesaid first embodiment. FIGS. 7A and 7B show a change of the estimated acceleration $\alpha_v$ and vehicle speed when the vehicle starts and accelerates if phase compensation is performed as according to this embodiment.

The data of FIGS. 6A and 6 are results calculated for the case $T_M$=0.5(sec), K=10.0.

The data of FIGS. 7A and 7B are results calculated for $T_1$=0.125(sec), $T_2$=0.49(sec), $T_M$=0.5(sec), K=4.0.

From a comparison of FIG. 6A and FIG. 7A, it is seen that when the phase compensator 17 is added, the response of the estimated acceleration $\alpha_v$ is improved at 2.5–5.0[sec] immediately after the vehicle starts, and variation of the estimated acceleration $\alpha_v$ is smooth.

Figure 8:
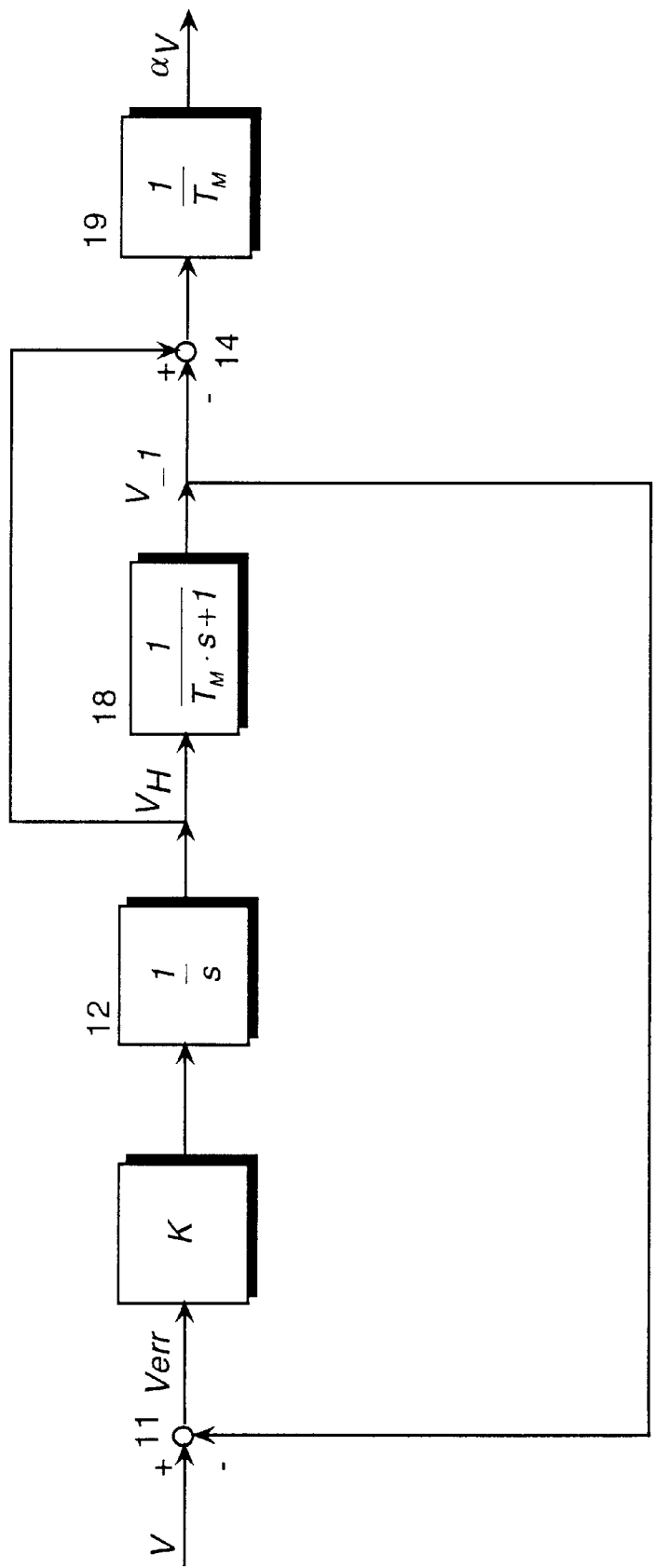
FIG. 8 is a block diagram of an acceleration estimation device according to a third embodiment of this invention.

FIG. 8 shows a third embodiment of this invention.

According to this embodiment, the feedback compensation output $V_H$ obtained as in the case of the aforesaid first embodiment, is multiplied by a first-order delay component $G_M(S)$ so as to find the estimated vehicle speed $V_{-1}$. The estimated acceleration $\alpha_v$ is found by dividing a deviation between the estimated vehicle speed $V_{-1}$ and feedback compensation output $V_H$, by the first-order delay time-constant $T_M$. The remaining features of the construction are the same as those of the aforesaid first embodiment.

A first-order delay component $G_M(S)$ is represented by the following expression (12).

$$G_M(s) = \frac{1}{T_M \cdot s + 1} \quad (12)$$

where, $T_M$ is a value set arbitrarily by the first-order delay time-constant.

The divider 18 performs division on the feedback compensation output $V_H$ corresponding to the expression (12) so as to compute the estimated vehicle speed $V_{-1}$. The estimated acceleration $\alpha_v$ is then calculated by dividing the deviation between the feedback compensation output VH and estimated vehicle speed $V_{-1}$, by the first-order delay time-constant $T_M$ in the divider 19.

Accordingly, the estimated acceleration $\alpha_v$ may be represented by the following expression (13).

$$\alpha_v = \frac{1}{T_M} \cdot (V_H - V_{-1}) \quad (13)$$

The expression (13) is equivalent to the expression (3) of the first embodiment (3). Accordingly, the same effect is provided by this third embodiment as the first embodiment.

Figure 9:
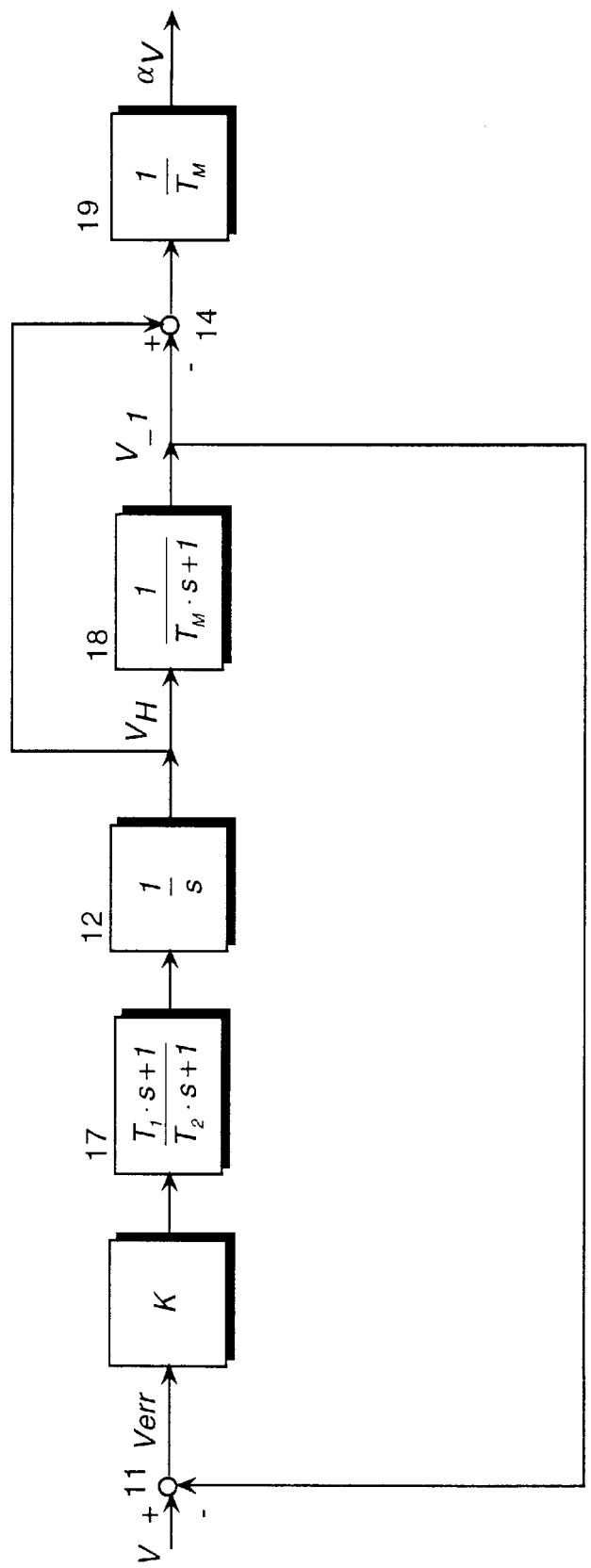
FIG. 9 is a block diagram of an acceleration estimation device according to a fourth embodiment of this invention.

FIG. 9 shows a fourth embodiment of this invention.

In this embodiment also, the same phase compensation as that of the second embodiment is applied.

For this purpose, the phase compensator 17 is added to the construction of the third embodiment. According also to this embodiment, the response of the estimated acceleration $\alpha_v$ immediately after the vehicle starts is improved, and the variation of the estimated acceleration $\alpha_v$ is smooth as in the case of the aforesaid second embodiment.

Figure 10:
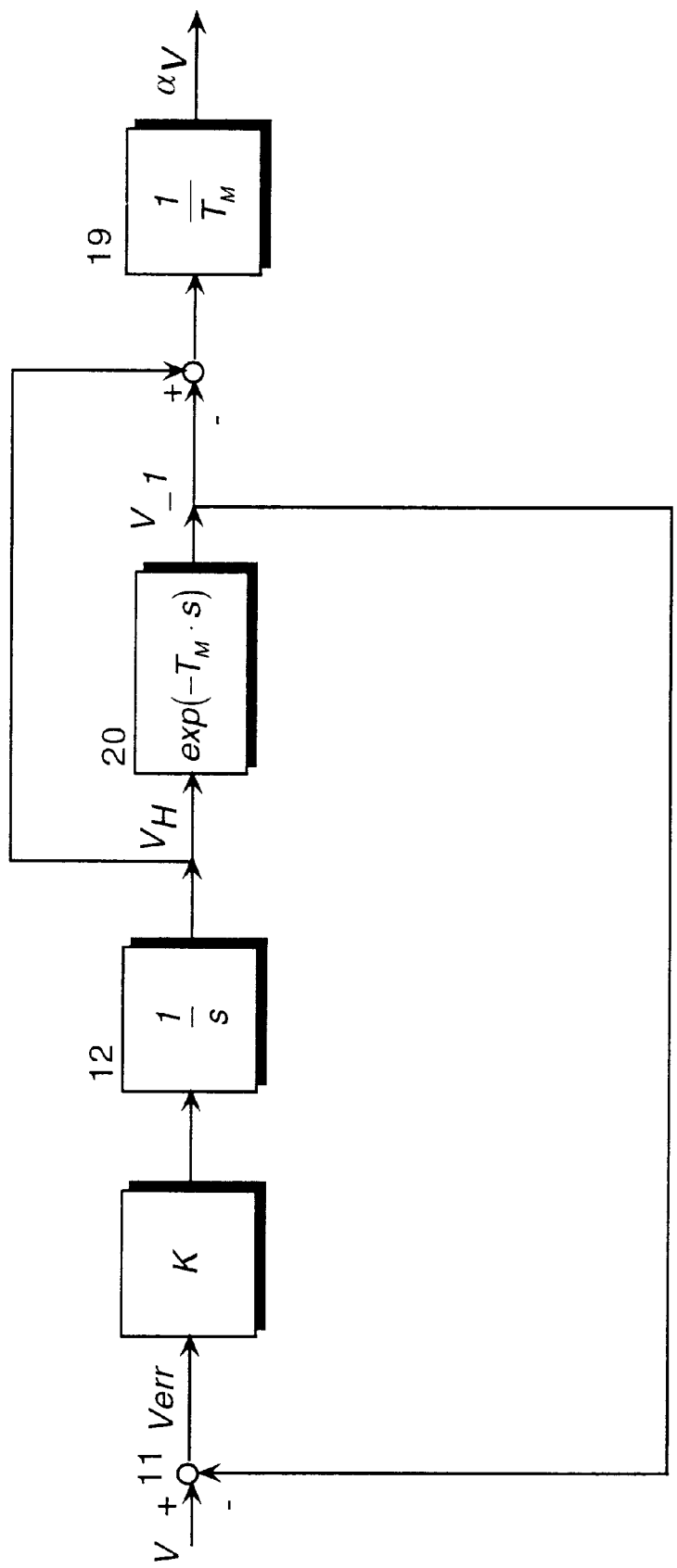
FIG. 10 is a block diagram of an acceleration estimation device according to a fifth embodiment of this invention.

FIG. 10 shows a fifth embodiment of this invention.

According to this embodiment, the first-order delay component $G_M(s)$ of the third embodiment is replaced by the dead-time of the following expression. For this purpose, the divider 18 is replaced by a dead-time computer 20. The remaining features of the construction are the same as those of the aforesaid third embodiment.

$$G_M(s) = \exp(-T_M \cdot s) \quad (14)$$

When the delay component is a dead-time, the estimated vehicle speed $V_{-1}$ is a value $T_M$ seconds before the feedback compensation output $V_H$. Accordingly, when the estimated vehicle speed $V_{-1}$, and true vehicle speed V coincide, the estimated acceleration $\alpha_v$ can be found by the aforesaid expression (12) by digital differentiation. Therefore, according also to this embodiment, the acceleration can be estimated precisely as in the case of the aforesaid third embodiment.

The embodiments of this invention in which an exclusive property or privilege is claimed are defined as follows:

What is claimed:

1. A device for estimating an acceleration of a vehicle comprising:

a sensor for detecting a traveling speed of the vehicle, and a microprocessor programmed to:

calculate a first deviation between said traveling speed and an estimated vehicle speed calculated beforehand, calculate a feedback compensation output based on said first deviation and a predetermined function, output a second deviation between a value obtained by performing a delay processing on the feedback compensation output and said estimated vehicle speed as an estimated acceleration, and calculate said estimated vehicle speed by performing a delay processing on said estimated acceleration.

2. An acceleration estimation device as defined in claim 1, wherein said predetermined function comprises an integrator and a constant gain.

3. An acceleration estimation device as defined in claim 1, wherein said predetermined function comprises an integrator, a constant gain and a phase compensator.

4. A device for estimating an acceleration of a vehicle comprising:

a sensor for detecting a traveling speed of the vehicle, and a microprocessor programmed to:

calculate a first deviation between said traveling speed and an estimated vehicle speed calculated beforehand, calculate a feedback compensation output based on said first deviation and a predetermined function, calculate said estimated vehicle speed by multiplying said feedback compensation output by a delay component based on a delay time $T_M$, and calculate an estimated vehicle acceleration by dividing a second deviation between said estimated vehicle speed and said feedback compensation output by said delay time $T_M$.

5. An acceleration estimation device as defined in claim 4, wherein said delay component is given by the following expression.

$$G_M(s) = \frac{1}{T_M \cdot s + 1}$$

where, $G_M(s)$=Delay component,
$T_M$=Delay time,
s=Laplacian operator.

6. An acceleration estimation device as defined in claim 4, wherein said predetermined function comprises an integrator and a constant gain.

7. An acceleration estimation device as defined in claim 4, wherein said predetermined function comprises an integrator, a constant gain and a phase compensator.

8. An acceleration estimation device as defined in claim 7, wherein a phase compensation function of said phase compensator is given by the following expression:

$$G_h(s) = \frac{T_1 \cdot s + 1}{T_2 \cdot s + 1}$$

where, $G_h(s)$=phase compensation function
$T_1$=phase compensation constant 1
$T_2$=phase compensation constant 2
s=Laplacian operator.

9. An acceleration estimation device as defined in claim 4, wherein said delay component comprises the following expressions:

$$G_M(s) = \exp(-T_M \cdot s)$$

where, $G_M(s)$=dead time
$T_M$=delay time
s=Laplacian operator.

* * * * *